US012778093B2

(12) United States Patent
Jiang

(10) Patent No.: US 12,778,093 B2
(45) Date of Patent: Nov. 3, 2026

(54) HIGH-STRENGTH FISHING HOOK

(71) Applicant: Zihua Jiang, Jiangxi Province (CN)

(72) Inventor: Zihua Jiang, Jiangxi Province (CN)

( * ) Notice: Subject to any disclaimer, the term of this patent is extended or adjusted under 35 U.S.C. 154(b) by 0 days.

(21) Appl. No.: 18/989,386

(22) Filed: Dec. 20, 2024

(65) Prior Publication Data

US 2026/0174068 A1 Jun. 25, 2026

(51) Int. Cl.
*A01K 83/00* (2006.01)

(52) U.S. Cl.
CPC .................................... *A01K 83/00* (2013.01)

(58) Field of Classification Search
CPC ...................................................... A01K 83/00
See application file for complete search history.

(56) References Cited

U.S. PATENT DOCUMENTS 842,594 A * 1/1907 Van Vleck et al. .... A01K 83/00 43/43.16
1,430,626 A * 10/1922 Christensen ........... A01K 83/00 43/43.16
2,164,807 A * 7/1939 Evans .................... A01K 83/00 43/43.16
4,905,402 A * 3/1990 Clark ..................... A01K 83/00 43/43.16
5,297,356 A * 3/1994 Wickham ............... A01K 83/00 43/43.16
D746,941 S * 1/2016 Bartell ......................... D22/144

* cited by examiner

*Primary Examiner* — Michael H Wang
(74) *Attorney, Agent, or Firm* — McHale & Slavin, P.A.

(57) ABSTRACT

A high-strength fishing hook that includes a hook body, a hook eye fixedly connected to the top end of the hook body used for securing the hook, and a hook point at the other end of the hook body. Both sides of the hook body surface are stamped. The two stamped surfaces of the hook body are angled symmetrically to each other, forming a smaller hook thickness on outside edge of the hook body and gradually broadening up towards the inside edge of the hook. In usage, the force loaded on a fishing hook is mainly outward pulling force. The two symmetrically stamped surfaces on the hook body that formed a larger thickness on the inside and smaller thickness on the outside of the hook body improves its strength and extends its service lifespan.

9 Claims, 6 Drawing Sheets

HIGH-STRENGTH FISHING HOOK

FIELD OF THE INVENTION

The disclosed invention relates to the technical field of fishing gear, and more specifically, a new type of high-strength fishing hook.

BACKGROUND OF THE INVENTION

A fishing hook is a tool for catching fish. It is usually made of steel wire, with a bent section at one end for hooking the mouth or throat of the fish. The design of the fishing hook makes it difficult for the fish to escape, so that the fisherman can easily catch the fish. Fishing hook is an indispensable tool in the sport of fishing. They are available in different styles and sizes, each suited for different types and sizes of fish.

Fishing hook is usually made of steel and can be used in various water environments. The process of manufacturing fishhook is usually cold forging or hot forging. After heating the steel wire to an appropriate temperature, the steel wire is forged using special mechanical equipment to deform the steel wire and obtain a desirable shape. The rigidity and stability of traditional fishing hooks are relatively weak. When subjected to large load, the tensile and bending resistance are relatively poor, which affects its service life.

SUMMARY OF THE INVENTION

In view of the shortcomings of current technologies, the utility model provides a new type of high-strength fishing hook, which aim to improve the rigidity and stability of fishing hooks. To achieve the above purpose, the utility model is implemented by the following technical scheme:

A new type of high-strength fishing hook, which includes a hook body, a hook eye fixedly connected to the top of the hook body, and hook point at the other end of the hook body. Both sides of the hook body are stamped, and the two stamped surfaces of the hook body are angled symmetrically to each other, forming smaller hook thickness on outside edge of the hook body and gradually broadening up towards the inside edge of the hook.

In the above scheme, since the force loaded on a fishing hook is mainly outward pulling force, the two symmetrically stamped surfaces on the hook body that formed a larger thickness on the inside and smaller thickness on the outside of the hook body improves its strength and extends its service lifespan. This formed structure enables the fishing hook to withstand greater pulling force without deformation and fracturing, giving the fishing hook body better tensile strength.

The two stamped surfaces are inclined surfaces, with the distance between the two inclined surfaces being closer to each other near the outside edge of the hook body and gradually broadening up towards the inside of the hook body to form an acute angle. The inclined surfaces are more conducive to its stamping process.

The acute angle formed by the two inclined surfaces is limited to between 30-60 degrees. This limitation optimizes the tensile strength of the hook body. Angles below or beyond this range are found to reduce the tensile strength of the hook body.

The inner side of the fishhook body, which is the third surface that is forming the triangular cross section with the two inclined surfaces, is a flat surface. The sharp vertex formed by the two inclined surfaces transits into a rounded arc surface, and the vertices between the two inclined surfaces and the flat inner surface transits other into two arc surface respectively. This structure can further increase the strength of the hook body.

The stamped surfaces are curved surfaces, and distance between the two surfaces gradually broadened up from the outside to the inside of the hook body.

The stamped surfaces of the hook body are formed by cold pressing or hot pressing.

In the above scheme, the cold pressing and hot pressing to form the inclined stamped surface do not reduce the material of the hook body, and will improve the tensile strength of the hook body to a certain degree.

The fishhook body includes a bent section called the hook bend, which is directly connected to the hook point. The stamped surfaces typically existed on the hook bend, and may extend along the length hook body.

In the above scheme, the main force-bearing or easily deformed part of the hook body is the hook bend, and the stamped surface typically existed on hook bend to enhance the tensile strength of this hook section, thereby improving the overall structural integrity.

The two stamped surfaces are symmetrically distributed on both sides of the hook bend. In the above scheme, the symmetrical distribution of the two stamped surfaces can make the strength of the hook bend more uniform, and prevent deformation and bending due to uneven strength.

The hook eye, hook point and the hook body are connected as one body. The hook body includes a straight section call the hook shank, and at least one hook bend that connects directly below it.

The utility model provides a high-strength new fishing hook. Compared with current technologies, the invention has the following beneficial effects:

The high-strength new fishing hook is stamped on both sides of the fish hook body by cold pressing or hot pressing, so that the stamped surfaces produce a hook body that is thicker on the inside and narrower on the outside. Such a structure improves the strength of the hook body and extends the service life of the fishing hook.

The high-strength new fishing hook design has strong adaptability and good stability can be applied to all existing fishing hook styles on the market. The shape of the hook body produces strength comparable to steel, enabling it to withstand greater tension and pressure before deformation or fracture take occur.

DETAILED DESCRIPTION OF THE PREFERRED EMBODIMENT

The following will clearly and completely describe the technical scheme in the embodiment of the utility model with reference to its schematic diagrams. The descriptions are only a part of the embodiment of the utility model, and not all of the embodiments. Based on the embodiment of the utility model, all other embodiments obtained by ordinary technicians in this field without creative work are within the scope of protection of the utility model.

With reference to FIGS. 1-5, 1 hook body; 2 hook point; 3 hook eye; 4 stamped surface; 11 hook shank; 12 hook bend; 5 flat surface; 6 second arc surface; 7, first arc surface. The disclosed invention provides a technical scheme: a high-strength new fishing hook, which includes a hook body 1, a hook eye 3 fixedly connected to the top of the hook body 1, and a hook point 2 fixedly connected to the other end of the hook body 1. The hook body 1, the hook eye 3 and the hook point 2 are formed by a single piece high-strength metal, such as steel or alloy steel.

Figure 1:
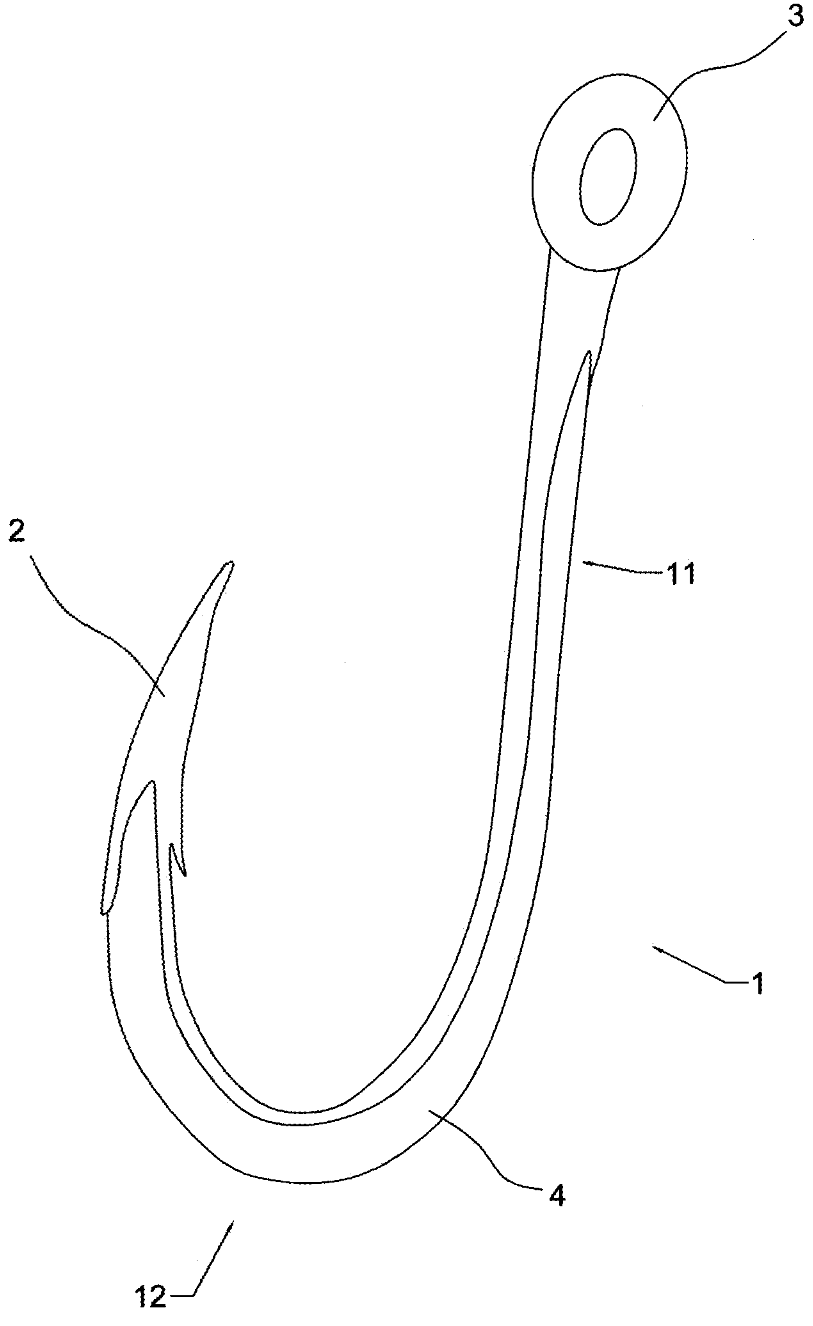
FIG. 1 is a schematic diagram of the structure of the utility model.
Figure 2:
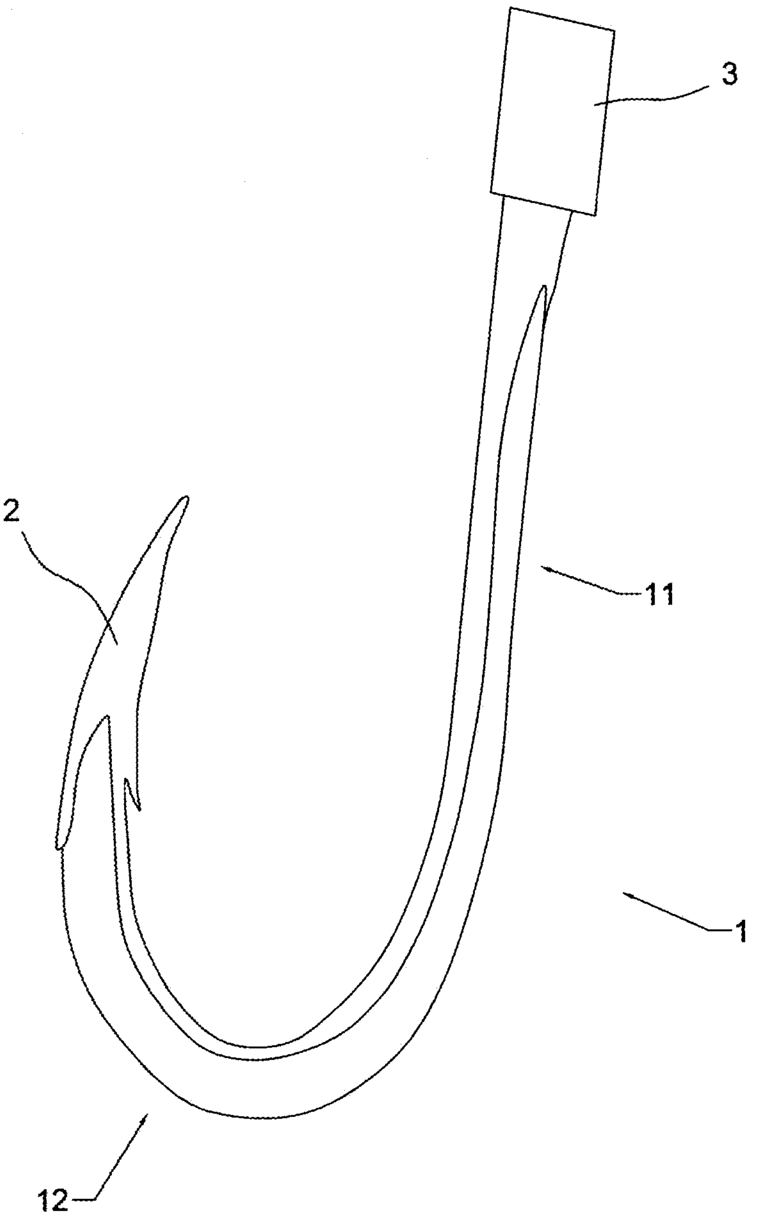
FIG. 2 is a schematic diagram of the structure of the utility model with a closed hook eye.
Figure 3:
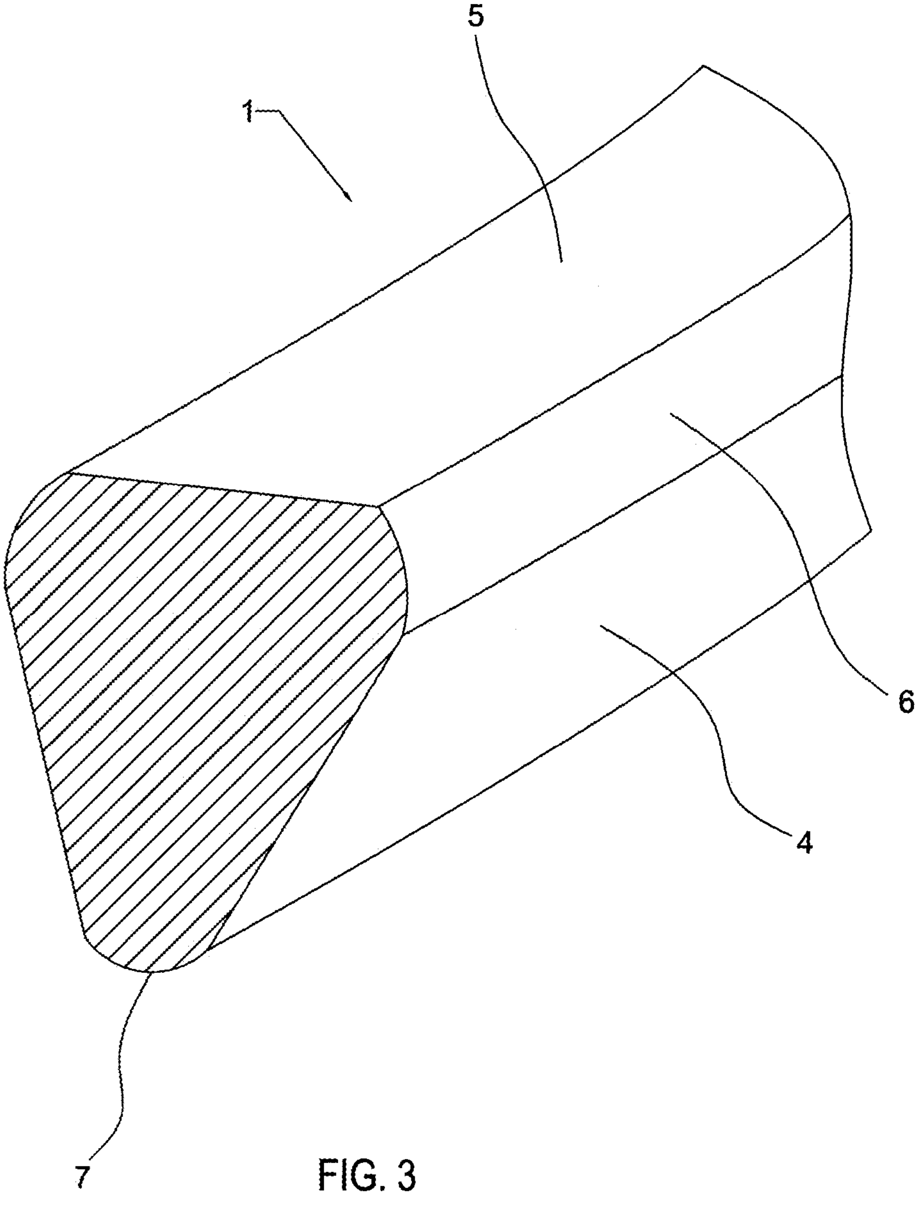
FIG. 3 is a cross-sectional view of the hook bend of the utility model.

The hook body 1 consists of a straight section hook shank 11 and at least one hook bend 12 connected directly below the hook shank 11. In FIGS. 1 and 2, the lower end of the hook shank 11 is connected to a hook bend 12, which is called a single-hook fishing hook. In order to increase the tensile strength of the hook body 1, two stamped surfaces 4 are formed by cold pressing on both sides of the hook bend 12 and part of the hook shank 11 of the hook body 1, which are sections of the hook most prone to deformation and fracture. The two sides of the hook body 1 refer to the two sides of the plane where the hook bend 12 is located. The two stamped surfaces 4 are arranged opposite to each other and extend along the hook shank 11 of the hook body 1. Specifically, the two stamped surfaces 4 are symmetrically distributed on both sides of the plane where the hook bend 12 is located. The stamped surfaces 4 are inclined surfaces. The cross section of the hook body 1 before cold pressing is circular. The two stamped surfaces 4 gradually broaden up from the outside to the inside of the hook body. The inside here refers to the inside of the hook bend 12, and the outside refers to the outside of the hook bend 12. The angle between the two stamped surfaces 4 is an acute angle of 40 degrees. The inside of the hook bend 12 is formed with a flat surface 5 that is distributed in a triangular shape with the two stamped surfaces 4. The angle between the two stamped surfaces 4 is transited into a first arc surface 7, and the angles between the two stamped surfaces 4 *a* and the flat surface 5 are transited into two second arc surfaces 6. Therefore, the cross section of the hook bend 12 is roughly a triangle with rounded corners.

Figure 4:
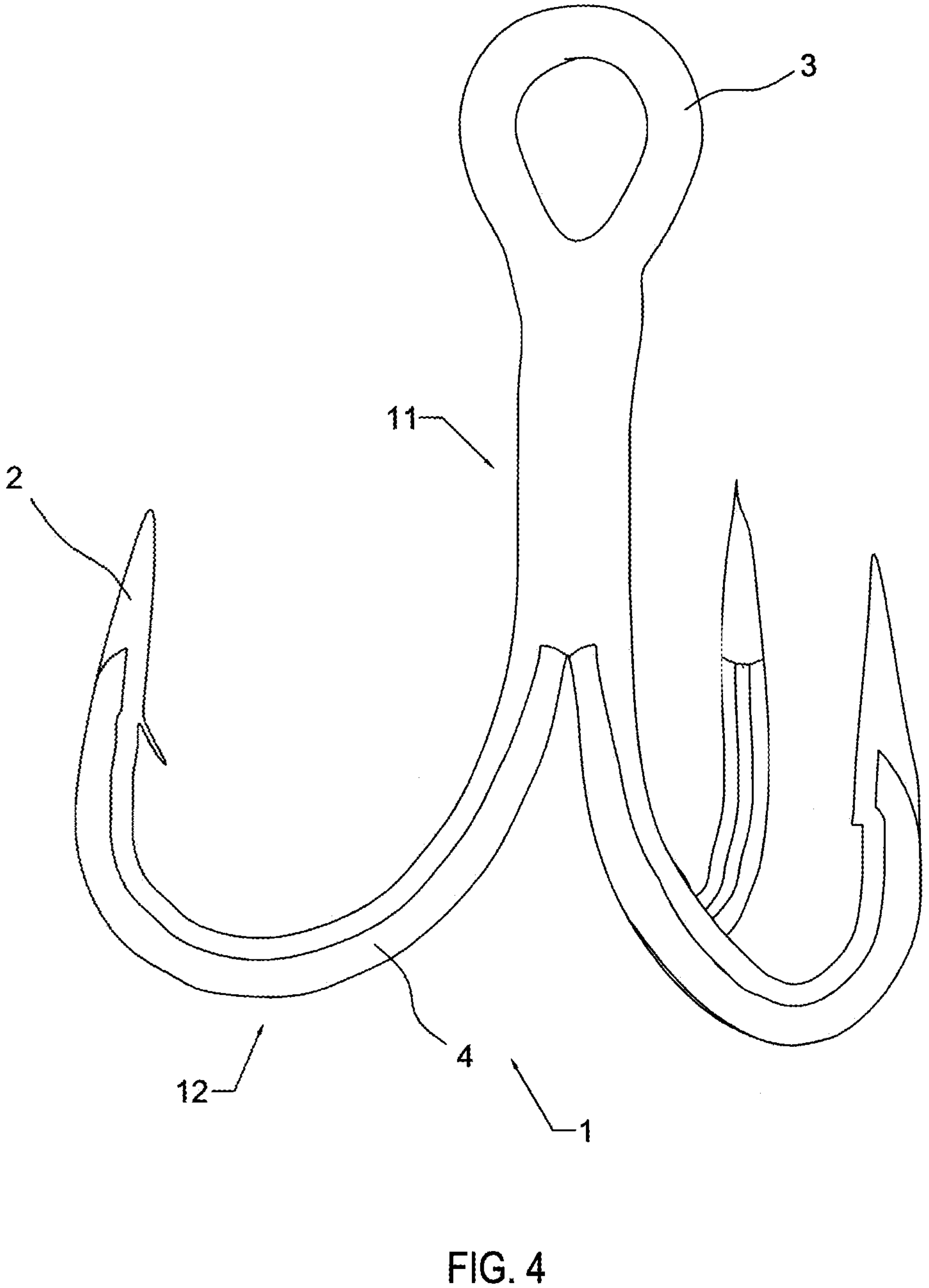
FIG. 4 is a schematic diagram of the structure of the utility model in the form of a treble hook.
Figure 5:
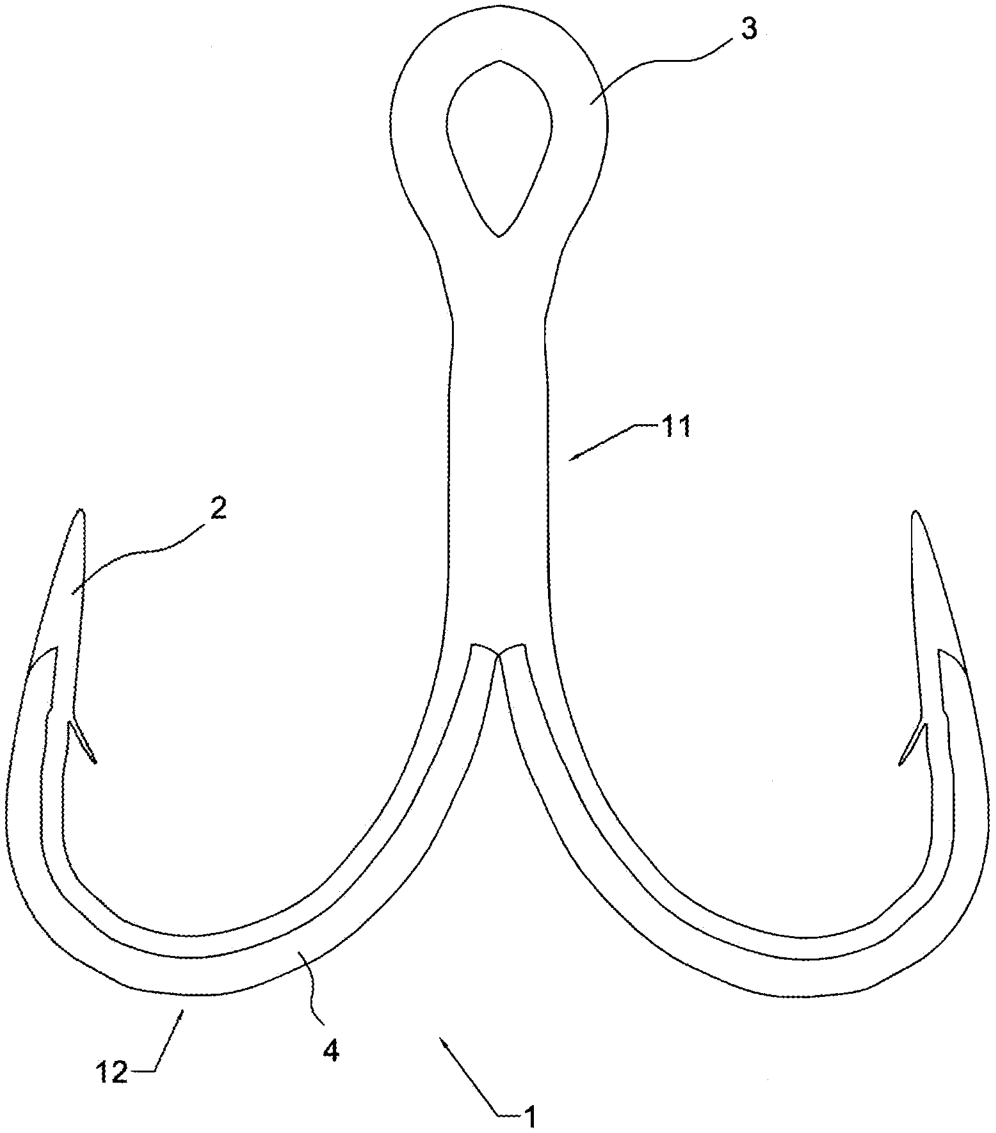
FIG. 5 is a schematic diagram of the structure of the utility model in the form of a double hook.

The hook eye 3 of a fishing hook and either exist as opened hook eye as shown in FIG. 1 or closed hook eye as shown in FIG. 2. As shown in FIG. 4, the hook body 1 is composed of a straight section hook shank 11 and three hook bends 12 connected below the hook shank 11, known as a treble-hook. As shown in FIG. 5, the hook body 1 is composed of a straight section 11 and two hook bends 12 connected below the hook shank 11, known as a double-hook. In these two embodiments, due to the limitations of the manufacturing process by product structure, the hook shank 11 cannot be stamped, and stamped surfaces 4 only exist on the hook bend 12.

The forging process, coupled with the special shape of the hook body 1, which is wide on the inside and narrow on the outside, enable the outer surface of the hook body 1 to form a supporting force on its inner wall, which help reduce fracturing at the hook bend 5 and improve the strength of the hook body 1, extending the service life of the hook body 1.

The high-strength new type of fishing hook can be used after attaching the fishing line directly to the hook eye 3. When the hook point 2 is hooked onto the fish's mouth, the hook eye 3 pulls on the hook body 1, and the hook bend 4 will bear the load created of the weight of the fish. The special shape of the hook body 1 enable the outer surface of the hook body 1 to form a supporting force on its inner wall, which help prevent the deformation or fracture of the hook bend 2, improving the overall strength of the hook body 1 and extending the service life of the hook. The high-strength new type of fishing hook design can be adopted on all fishing hook styles currently available on the market, with strong adaptability and good stability, enabling the fishing hooks to withstand greater tension before deformation or fracture.

Figure 6:
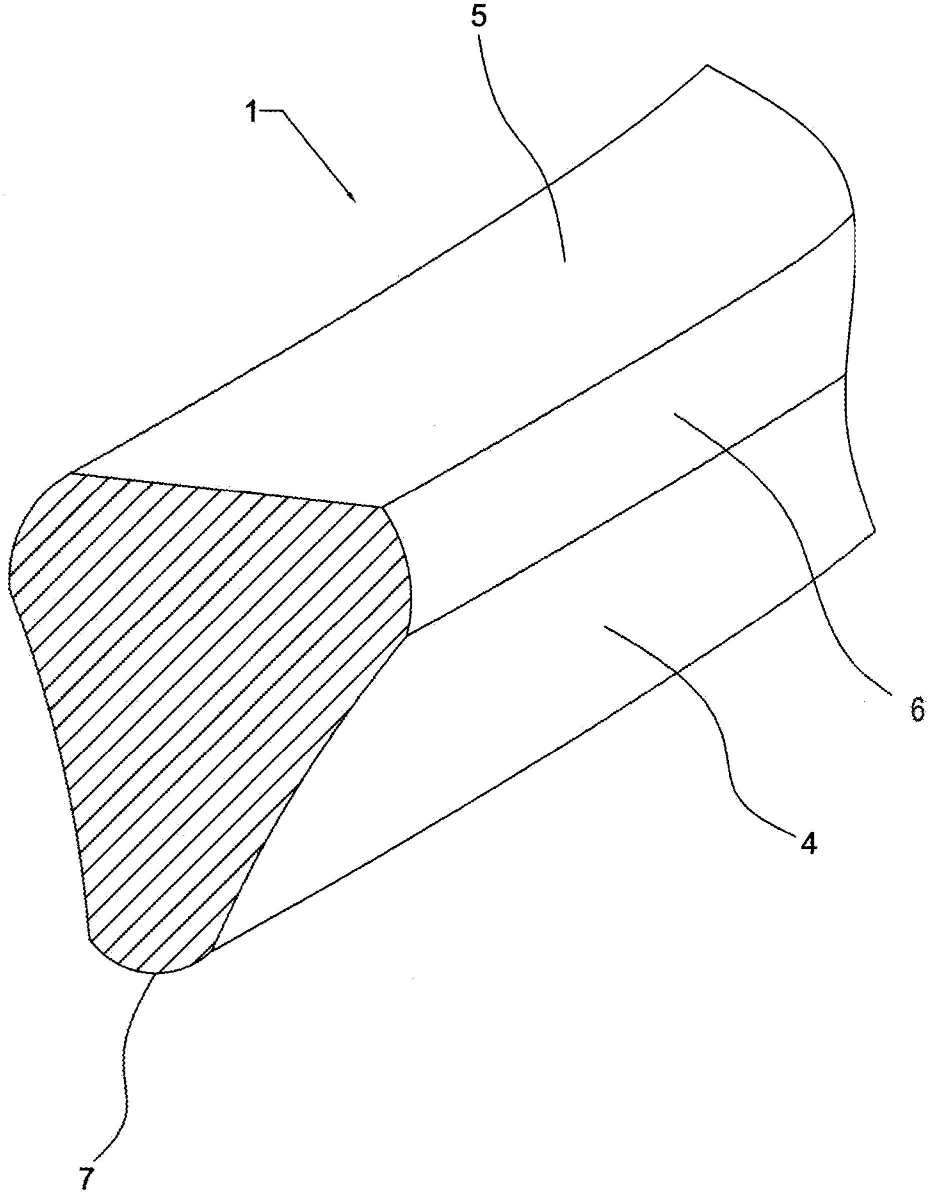
FIG. 6 is a cross-sectional view of another structural configuration of the hook bend of the utility model.

As shown in FIG. 6, the stamped surface 4 can also be a concave surface, and the two concave surfaces gradually broaden up from the outside to the inside of the hook body 1. The stamping surface 4 can also be of other special-shaped surfaces, as long as the stamped part of the fishhook body presents a hook body 1 structure with a wider inside and a narrower outside, the strength of the hook body 1 can be improved and the service life of the fishing hook extended.

Contents not described in detail in this manual belong to the existing technologies known to technicians in the industry.

What is claimed is:

1. A high-strength fishing hook comprising a hook body (1), a hook eye (3) fixedly connected to the top of the hook body (1), and a hook point (2) at the other end of the hook body, said hook is characterized in that both sides of said hook body (1) are stamped surfaces (4) through pressing, and the two Stamped surfaces (4) of the hook body (1) are angled symmetrically from each other wherein a distance between the two stamped surfaces (4) are closer to each other on an outer side of the hook body (1) and gradually broaden up towards the inner side of said hook body (1), said stamped surfaces (4) being formed on opposing sides of the hook body (1) at a hook bend (12) and extending into a portion of a hook shank (11).

2. The fishing hook according to claim 1 wherein the characteristics of the stamped surfaces (4) are inclined surfaces which gradually broaden up to an acute angle from the outside to the inside of the hook body (1).

3. The fishing hook according to claim 2 wherein said acute angle is formed by the two inclined surfaces (4) is 30-60 degrees.

4. The fishing hook according to claim 2 wherein said inner side of the fishing hook body (1) is a flat surface (5) that forms an isosceles triangular cross section with the two inclined surfaces, and the vertex of the two inclined surfaces transit into a first arc surface (7), and the vertices between the two inclined surfaces and the flat surface (5) transits into two second arc surfaces (6).

5. The fishing hook according to claim 1 wherein the stamped surfaces (4) are curved surfaces, and the distance between the two curved surfaces gradually broaden up from the outside to the inside of the fishing hook body (1).

6. The fishing hook according to claim 1 wherein the stamped surfaces (4) are formed on the hook body (1) by cold pressing or hot pressing wherein said pressing enhances the tensile strength of the hook bend and shank.

7. The fishing hook according to claim 1 wherein the two stamped surfaces (4) are symmetrically distributed on both sides of the hook bend (12), which forms the line of symmetry.

8. The fishing hook according to claim 1 wherein the hook eye (3), the hook point (2) and the hook body (1) are fixedly connected as one single body.

9. The fishing hook according to claim 1 wherein said fishhook body (1) includes the hook shank (11) and the hook bend (12) that is fixedly connected below the hook shank (11).

* * * * *